United States Patent Office 3,310,562
Patented Mar. 21, 1967

3,310,562
PYRIDINE-CUPRIC COMPLEXES WITH HALOPHENOLS
Harry S. Blanchard, Schenectady, and Herman L. Finkbeiner, Ballston Lake, N.Y., assignors to General Electric Company, a corporation of New York
No Drawing. Original application Dec. 31, 1962, Ser. No. 248,228, now Patent No. 3,256,243, dated June 14, 1966. Divided and this application Sept. 2, 1965, Ser. No. 510,415
8 Claims. (Cl. 260—270)

This application is a division of our application, Ser. No. 248,228, filed Dec. 31, 1962, now U.S. Patent 3,256,243. This invention relates to new chemical compounds and to a method of their production. More specifically, this invention relates to the cupric complex having the formula

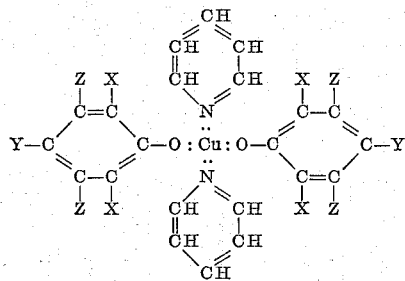

where Y is a halogen selected from the group consisting of fluorine and chlorine and, in addition, bromine when X and each Z are bromine, Y is a halogen selected from the group consisting of chlorine, bromine and iodine, and Z is a monovalent substituent selected from the group consisting of hydrogen, fluorine and chlorine, and, in addition, bromine when Y and each X are bromine and to the method of preparation of these compounds.

The novel complexes are readily prepared by reacting a phenol having the formula

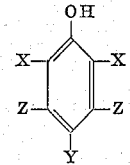

where Y is a halogen selected from the group consisting of fluorine and chlorine and, in addition, bromine when Y and each Z are bromine, Y is a halogen selected from the group consisting of chlorine, bromine and iodine and Z is a monovalent substituent selected from the group consisting of hydrogen, fluorine and chlorine and, in addition, bromine when Y and each X are bromine, in a solution also containing cupric hydroxide and pyridine. Pyridine is apparently unique in forming our novel crystalline complexes. The cupric hydroxide may be added as such, formed in situ from a cupric salt and hydroxide, or by using a cupric salt and the alkali metal salt of the phenol, all of which produce the same novel complex and, therefore, are equivalent. The reaction proceeds readily at room temperature, but may be hastened by heating, providing excess pyridine is used which stabilizes the complex from decomposing to form the poly(halophenylene ethers). The cupric hydroxide does not completely dissolve until the complex with the halophenol and pyridine is formed, thus permitting one to readily determine when the reaction is complete.

The phenols which can be used are represented by the above general formula. Typical examples of such phenols are, by way of example, 2,4,6-trichlorophenol, 2,3,4,6-tetrachlorophenol, pentachlorophenol, pentabromophenol, 2,6-dichloro-4-bromophenol, 2,6-dichloro-4-iodophenol, 2,6-difluoro-4-chlorophenol, 2,6-difluoro-4-bromophenol, 2,6-difluoro-4-iodophenol, 2,3,5,6-tetrafluoro - 4 - chlorophenol, 2,6 - difluoro - 3,5 - dichloro-4-bromophenol, 2-chloro-3-bromo-6-fluorophenol, etc.

By use of the lower aliphatic alcohols such as methanol and ethanol, the copper complex of the phenol and pyridine precipitates readily from the solution so that it can readily be removed by filtration. If a solvent is used for the process in which the complex is soluble, for example, benzene, toluene, etc., methanol can be added to precipitate the complex, or the solution can be evaporated under vacuum at room temperature to evaporate the solvent and deposit the complex as the residue. These complexes may be purified by recrystallizing one or more times and are obtained as glistening brown crystals.

When these complexes are dissolved in a solvent having a boiling point of at least 80° C. and heated to a temperature of at least 80° C. up to the reflux temperature of the solution, these complexes thermally decompose to produce a poly(halophenylene ether) and a complex of pyridine and a cupric salt containing the halogen removed from the phenol. Such a process is disclosed and claimed in our copending application, Ser. No. 248,228, now U.S. Patent 3,256,243 from which this application was divided.

The thermal decomposition of our copper complexes is capable of producing poly(halophenylene ethers) having molecular weight in the range of 7,500 to 12,000 and higher. Poly(halophenylene ethers) have previously been made, for example, by Hunter et al., J. Am. Chem. Soc., 38, 1761 (1916), by preparation of silver salts of the halophenols which are then thermally decomposed in solution to precipitate silver halide, leaving the polymer in solution. The use of silver makes this an extremely expensive method of preparation.

In forming our novel crystalline cupric complexes, the reaction involves 2 moles of phenol, 2 moles of pyridine and 1 mole of cupric hydroxide. It is therefore possible to form a crystalline complex which has two different phenol molecules on the same copper atom, which can then be thermally decomposed to give a copolymer.

In order that those skilled in the art may better understand our invention, the following examples are given which are illustrative of the practice of our invention, and are not intended for purposes of limitation. In the examples, all parts are by weight, unless otherwise stated.

EXAMPLE 1

This example illustrates two methods for the formation of the cupric complex by starting with either cupric hydroxide or with a cupric salt.

Method A

One mole of cupric hydroxide, 2 moles of the halophenol and 200 ml. of pyridine are added to 4 liters of methanol. The heterogeneous mixture is stirred magnetically for 4 hours, during which time the color changes from blue to brown. At the end of the 4 hours, the solids are removed by filtration and recrystallized by dissolving in hot benzene containing pyridine. After filtering the hot solution to remove any undissolved material, this solution is diluted with methanol and cooled whereupon the copper complex crystallizes as glistening brown crystals.

Method B

One mole of cupric chloride, 2 moles of the halophenol and 2 moles of a base, for example, sodium methylate, or potassium hydroxide, are dissolved in 4 liters of methanol. The product is reacted at room temperature for 2 hours and the resulting solid complex removed by filtration and purified as in Method A.

EXAMPLE 2

A general method of thermally decomposing the copper complexes is to dissolve the complex in a solvent having a boiling point of at least 80° C. and heating the solution usually at reflux. The copper pyridine halide complex is removed by filtration and the polymer precipitated from the solution with methanol.

EXAMPLE 3

Utilizing both Methods A and B of Example 1, 2,4,6-trichlorophenol produces a deep brown crystalline compound having 10.8% copper, 43.3% carbon, 2.35% hydrogen, 34.9% chlorine, and a molecular weight of 640, which agrees very well with the theoretical of 10.3% copper, 43% carbon, 2.28% hydrogen, 34.7% chlorine and a molecular weight of 614.5.

This complex has the formula

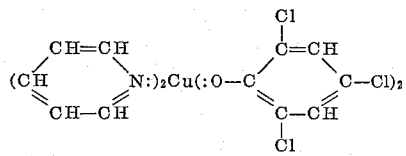

EXAMPLE 4

Repeating Example 3 but using 2,6-dichloro-4-bromophenol, produces a brown precipitate of the copper complex containing chlorine and bromine and having the formula

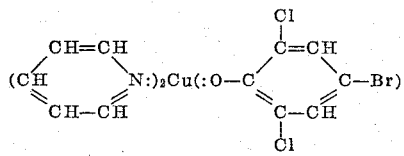

EXAMPLE 5

Repeating Example 3 but using pentachlorophenol in place of the 2,4,6-trichlorophenol, likewise gives a green precipitate having 8.3% copper, against the theoretical of 8.4%, and having the formula

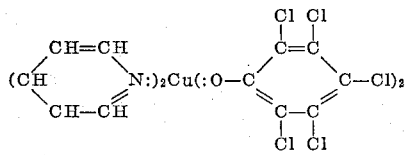

EXAMPLE 6

Repeating Example 3 but using pentabromophenol in place of the 2,4,6-trichlorophenol again produces a brown precipitate of the copper complex having the general formula

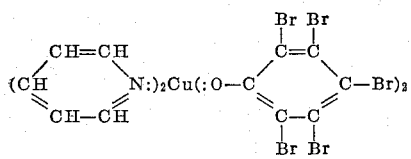

EXAMPLE 7

The copper complexes formed in the above examples, except those prepared from the pentahalophenols are readily thermally decomposed at temperatures as low as 80° C. by heating them in a solution of a solvent having a boiling point of at least 80° C. Evidently, the copper complexes from the pentahalophenols are more thermally stable since they do not decompose until heated to temperatures of 175° to 200° C., in an appropriate solvent, for example, diphenylether.

EXAMPLE 8

This example illustrates the higher thermal stability of the cupric complex from a pentahalophenol. A solution of 9.75 grams of cupric hydroxide, 53.3 grams of pentachlorophenol, 16 ml. of pyridine and 150 ml. of toluene were reacted by heating at reflux for 3 hours in a flask equipped with a reflux condenser and a trap for separating the water. At the end of the reaction time, the green solid which had precipitated from the solution was filtered off and identified as the copper pyridine complex of pentachlorophenol represented by the formula

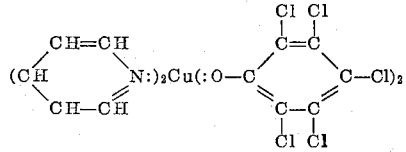

When this example was repeated using diphenyl ether in place of toluene as the solvent, and the solution refluxed for a period of 2 hours, there was obtained 26 grams of an almost white polymer of poly(tetrachlorophenylene ether) having an intrinsic viscosity of 0.02 and a chlorine content of 58.9% compared to a theoretical 61.7%.

Obviously, other modifications and variations of the present invention are possible in the light of the above teachings. It is, therefore, to be understood that changes may be made in the particular embodiments of the invention described which are within the full intended scope of the invention as defined by the appended claims.

What we claim as new and desire to secure by Letters Patent of the United States is:

1. A crystalline cupric complex having the empirical formula

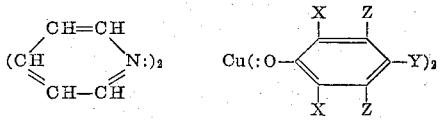

where X is a halogen selected from the group consisting of fluorine and chlorine and, in addition, bromine when Y and each Z are bromine, Y is a halogen selected from the group consisting of chlorine, bromine and iodine, and Z is a monovalent substituent selected from the group consisting of hydrogen, fluorine and chlorine and, in addition, bromine when Y and each X are bromine.

2. The cupric complex of claim 1 wherein each X, Y and Z is chlorine.

3. The cupric complex of claim 1 wherein each X and Y is chlorine and each Z is hydrogen.

4. The cupric complex of claim 1 wherein each X is chlorine, Y is bromine and each Z is hydrogen.

5. A method of making a crystalline cupric complex having the empirical formula

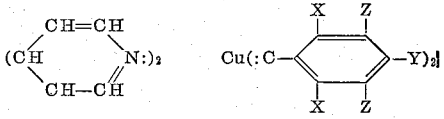

where X is a halogen selected from the group consisting of fluorine and chlorine and, in addition, bromine when Y and each Z are bromine, Y is a halogen selected from the group consisting of chlorine, bromine and iodine, and Z is a monovalent substituent selected from the group consisting of hydrogen, fluorine and chlorine and, in addition, bromine when Y and each X are bromine, which comprises reacting cupric hydroxide, pyridine and a phenol having the formula

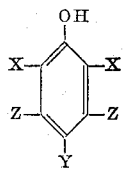

where X, Y and Z are as defined above, in an anhydrous solution and isolating the novel crystalline compound from the reaction mixture.

6. The process of claim 5 wherein X, Y and Z each is chlorine in the formulae of the complex and phenol.

7. The process of claim 6 wherein each X and Y is chlorine and Z is hydrogen in the formulae of the complex and phenol.

8. The process of claim 6 wherein each X is chlorine, Y is bromine and Z is hydrogen in the formulae of the complex and phenol.

References Cited by the Examiner

UNITED STATES PATENTS 3,219,625 11/1965 Blanchard et al. ___ 260—270 XR
3,219,626 11/1965 Blanchard et al.

OTHER REFERENCES

Blanchard et al.: J. Polymer Science, volume 58, pages 469 to 490 (1962).

Hays et al.: J. Am. Chem. Soc., volume 81, pages 6335 to 6336 (1959).

ALEX MAZEL, *Primary Examiner.*

D. G. DAUS, *Assistant Examiner.*